United States Patent [19]

Friedrich

[11] Patent Number: 4,597,468
[45] Date of Patent: Jul. 1, 1986

[54] COMPACT INDUSTRIAL VEHICLE

[75] Inventor: Karl Friedrich, Sipplingen, Fed. Rep. of Germany

[73] Assignee: Kramer-Werke GmbH, Ueberlingen, Fed. Rep. of Germany

[21] Appl. No.: 638,462

[22] PCT Filed: Dec. 1, 1983

[86] PCT No.: PCT/EP83/00323
§ 371 Date: Aug. 2, 1984
§ 102(e) Date: Aug. 2, 1984

[87] PCT Pub. No.: WO84/02316
PCT Pub. Date: Jun. 21, 1984

[30] Foreign Application Priority Data

Dec. 6, 1982 [DE] Fed. Rep. of Germany ....... 3245085

[51] Int. Cl.$^4$ .............................................. B60K 17/30
[52] U.S. Cl. ........................................ 180/255; 180/312
[58] Field of Search ............... 180/255, 260, 261, 262, 180/236, 234, 311, 312

[56] References Cited

U.S. PATENT DOCUMENTS

| 3,154,164 | 10/1964 | Shaw | 180/233 X |
| 3,179,194 | 4/1965 | Hunt | 180/234 X |
| 3,306,390 | 2/1967 | Jamme | 180/236 X |
| 3,677,572 | 7/1972 | Fontan | 280/39 |
| 4,289,214 | 9/1981 | Spence | 180/234 |

FOREIGN PATENT DOCUMENTS

| 2905528 | 8/1980 | Fed. Rep. of Germany . |
| 2127461 | 10/1972 | France . |
| 2238349 | 2/1975 | France . |
| 2347250 | 11/1977 | France . |
| 2472905 | 7/1981 | France . |
| 2505285 | 11/1982 | France . |
| 57-104414 | 6/1982 | Japan .................... 180/260 |
| WO79/00561 | 8/1979 | PCT Int'l Appl. . |
| 1595392 | 8/1981 | United Kingdom . |

OTHER PUBLICATIONS

Mini-Tractor Takes On Full Size Jobs, Machine Design, Apr. 22, 1982.

Primary Examiner—John A. Pekar
Attorney, Agent, or Firm—Toren, McGeady, Stanger, Goldberg & Kiel

[57] ABSTRACT

A compact industrial vehicle, for example in the form of a compact loader, has four steered wheels may be swiveled through 180° between two end positions. The vehicle has a straddling or gantry chassis and the wheels are mounted on straddling axles, whose axle members are placed towards the top of the wheels. Running down from the axle members there are oblique wheel mounting legs ending at the space inside the wheels, in which there is a drive for the final drive step down gearing. Therefore the vehicle is optimally maneuverable while the ground and the tires are not subjected to heavy wear, there are good running characteristics and the driver is able to board the vehicle easily.

13 Claims, 14 Drawing Figures

COMPACT INDUSTRIAL VEHICLE

The present invention relates to a compact industrial vehicle which is fitted or, is adapted to be fitted, with an appliance. More specially the invention relates to a compact loading vehicle with a loading shovel or if desired with a digging contrivance, a snow plow or some other appliance.

Operations undertaken with such attachments frequently have to take place in situations where space is at a premium, as for example on highway construction sites, in narrow streets, in ships' holds or in connection with indoor building or assembly operations. For such construction sites highly maneuverable compact motorized loaders may be used that are sold under the name of "Bobcat". With such vehicles steering is by braking that wheels on one side or even turning them in the opposite direction to the other side so that a very tight turning circle is possible. However, there is then the drawback of rapid tire wear and substantial loading or churning up of the ground; furthermore the vehicle is hard to drive, because the wheel spacing has to be small. Moreover to shorten the vehicle the loading means is pivoted on the back end on both sides of the vehicle and runs forwards along the side of the vehicle, but this makes it harder for the driver to get on and off the vehicle and obstructs his view and the vehicle is more likely to tip over. A further substantial shortcoming is the small ground clearance.

On the other hand the construction of very small, maneuverable industrial vehicles with steered driven axles also runs up against considerable difficulties since conventional wheel steering systems only make it possible for the wheel on the inner side when cornering to be swiveled through about 40°, although steered and driven axles have been designed to swivel through up to 60°. It has not however so far been possible for wheels on driven axles to be swiveled through larger angles because of the design of the shafts with two universal joints.

Furthermore an industrial vehicle as been proposed in the German Offenlegungsschrift specification No. 2,902.446 with four driven wheels that are mounted on separate upright wheel legs. The drive shaft is in this case placed within a hollow steering shaft and the means for supporting the wheel bearing and a bevel transmission for connection of the upright driving shaft with the horizontal driving shaft are placed next to each wheel near its axis. This known vehicle, that was designed as a light-weight and light-duty vehicle, has a quite inadequate ground clearance because of the components associated with the wheels, and the driver has to keep such lack of clearance constantly in mind more specially during off-road operations. Furthermore the known design of vehicle was hardly suitable for use with appliances like shovels having a heavy power requirement for operation.

In connection with attempts in the prior art to design industrial vehicles which may be steered in all directions (see the German Gebrauchsmuster Pat. No. 8,031,892), there was a proposal to mount the wheels of a fork lift truck like the wheels of a gantry or load-straddling crane on special freely swiveling legs running radially upwards from the wheels. Each wheel hub was then to be fitted with a hydraulic or electric drive motor. For steering, the wheel legs were to be swiveled by way of bevel gearing. Because all of the vehicle body was placed higher up than the level of the tops of the wheels, the vehicle was relatively tall and its center of gravity was correspondingly high up, so that stability was impaired and might well be insufficient for lifting heavy loads.

In a further proposal (see German Offenlegungsschrift specification No. 2,905,528) aimed at improving the design of the vehicle and more specially to increase stability and make it easier to board, parts of the chassis were to be placed like a gantry over the wheels. This known form of chassis had an outer chassis with the legs and a lower inner chassis obstructing the swiveling of the wheels. This form of chassis design would not be suitable for a compact industrial vehicle with a high degree of maneuverability.

One purpose of the present invention is that of creating a compact industrial vehicle of the sort referred to, which has a steering system enabling it to be maneuvered in a very tight space, while at the same time being endowed with a high degree of stability and a good ground clearance.

This purpose is effected by the invention wherein the combination of a gantry or straddling chassis running over the wheels with the gantry axles preferably running transversely and generally at the same level as the tops of the tires of the wheels means that the vehicle design is generally relatively squat, while at the same time wheels swivel through a very large angle and there is a large ground clearance between the wheels. The outcome is that the vehicle is of universal application for work in restricted spaces, that is to say including operations on soft ground or when there are heavy sideways forces acting on the vehicle.

To give a further improvement in ground clearance, it is possible to have a transmission with a large step down ratio in the wheel body. A still further contribution to reducing the chafing or scouring action on the tires so that there is a beneficial effect with respect to the floor wear rate and possible damage thereto. However, it is possible to tolerate a certain positive or negative king pin offset that is preferably still within the tire contact patches. This value for the king pin offset and the dimensions results in the limitation of the swivel of the wheels being by the axle member and the limitation may be such that the wheel swivels through 180° or slightly more.

A programmed drive system therefore contributes further to the reduction of chafing of the tires, because when turning in a tight circle the contact patch of the tires is not changed. The programmed action used may be an electronic one or produced by cams in a known way (see the German Offenlegungschrift specification No. 2,441,995). If a certain degree of inaccuracy of the steering may be tolerated, program control may be by way of a lever or the like system.

Due to the steering axis inclination and camber when the wheel is swiveled between its two end positions its inner face will define a conical space as needed to allow for the presence of the axle member. This is expedient in connection with enabling the wheels to be swiveled through 180°. In this respect the purpose of the measure to make crabbing (i.e. travel at 90° to the straight ahead direction) possible inasfar as in the limit position two wheels may be swiveled through 180°, on swiveling the wheels more and more so that the turning circle is increasingly diminished till the wheels are placed completely transversely, the settings of the wheels may be such, for example, that the front wheels thrust the vehicle to the left whereas the back wheels thrust it to the right. If the vehicle is now to crab, it will be necessary either for one of these pairs of wheels to be reversed with a reversing gear or one pair to be swiveled through 180°.

In the case of a further programmed mode of steering control it is however possible for the vehicle not only to be driven at 90° to the straight ahead direction but furthermore at any other angle to the straight ahead direction or obliquely. As an example, the steering arms may be joined together by selected steering tie rods that make use of the different components of transverse motion of the arcuate loci of the pivot points of the tie rods on the arms in order to produce different steering movements by the different linkage systems. With parallel alinement of the wheels the driving directions have to be the same in all cases. Steering linkages are known in another context, see for example the German Offenlegungsschrift specification No. 2,349,177.

As will have been made clear, the idea of the invention for the design of a compact industrial vehicle makes possible the construction of such vehicles that are not only very maneuverable but furthermore are very stable and have very good driving characteristics. As an example of this, the axle arm steering system makes possible a wheel base which is equal to at least 1.5 times the wheel diameter or for example in the case of an actual construction tested, more than 1.8 times the wheel diameter. This large wheel base in conjunction with the gantry or straddling chassis furthermore makes it possible to board the vehicle from the side. In this respect, the space under the axle mamber, i.e. the space that is confined at the sides by the wheel supports or legs running at a slope into the concave parts of the wheels, is to be kept free, or, if anything, parts of steering arms may be mounted on the lower side of the axle member in addition. Adjacent to the axles this space is used to allow for the swiveling motion of the wheel. The selection of the height of the axle members on the one hand and the free space thereunder on the other hand makes possible a good combination of a low center of gravity and good ground clearance. A still further contribution is rendered in this respect by the straddling chassis that is at a lower level between the wheels.

Another feature of the invention is to produce the right relationship between the size of the wheel on the one hand and of the vehicle on the other, and to make it possible by the programming of the steering and by the wheel dimensions, even making it possible to have a very large wheel diameter.

To achieve the compactness and low center of gravity it is preferred to place the driving engine to the side of the driver's seat (which has been used in another context, see U.S. Pat. No. 3,933,224), which is best used in combination with the feature of locating the crank shaft axis at a level lower than the wheel top. This makes it possible for the space under the axle member of the engine to be kept free. Furthermore the vehicle does not need to be made any longer.

It is possible to make the vehicle safer and more convenient for the driver than known compact industrial vehicles which the driver has to board by scrambling over the appliance, as for example a shovel. Lastly the vehicle is designed for accurate operation within very confined spaces under true working conditions. If the appliance on the vehicle is a loading shovel, the driver will be able to see the front edge from his seat and feel the full benefit of the maneuverability of the vehicle when working between obstacles or the like.

Further details, useful effects and developments of the invention will be seen from the following account of preferred working examples thereof using the figures.

Figure 1:
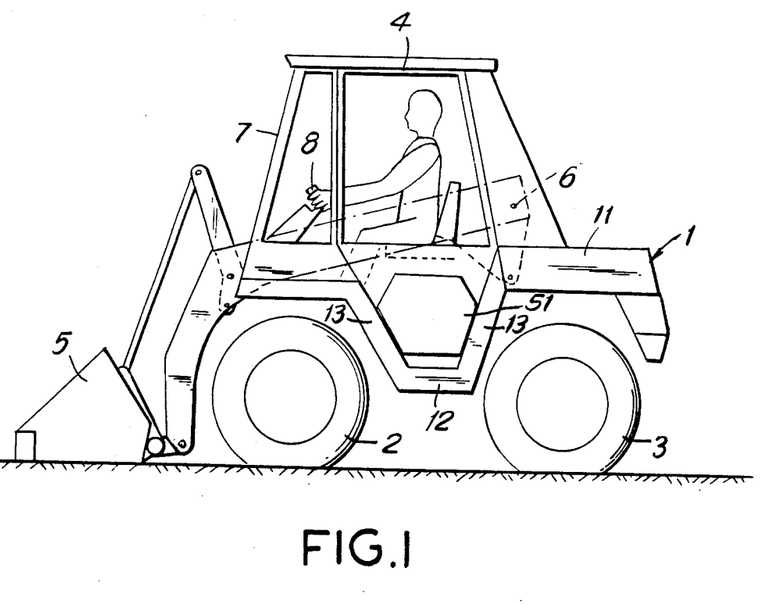
FIG. 1 is a diagrammatic side view of a compact industrial vehicle, that is to say a dwarf loader with a space saving design and a high degree of maneuverability.

FIG. 1 shows a compact industrial vehicle in keeping with the invention in the form of a compact shovel loader having a straddling or gantry chassis 1, front wheels 2, back wheels 3, a driver's cabin 4 and a boom-mounted appliance in the form of a loading shovel 5. The industrial vehicle is very space saving and highly maneuverable. To give some idea of the dimensions, by way of example, a medium sized vehicle of a series may have an overall height of 2000 to 2300 mm, an overall length without the appliance of 2300 to 2800 mm, a wheel diameter including tires of 800 to 900 mm and a track of 1000 to 1200 mm. The shovel 5 is pivotally mounted by way of the boom at a pivot point 6 located at the back of the driver's cabin on one side of the vehicle so that the boom is not in the way of the driver when it comes to getting into and out of the cabin 4 on the other side. The bottom of the windshield 7 is at a low enough level for the driver to have a good view of the area right in front of him and if the appliance is a loading shovel he will be able to see the front edge thereof from his seat. To this end the seat is relatively far forward and steering is by way of a handlebar 8 that only takes up a small area. The wheels 2 and 3 are placed as far apart as possible at the very ends of the chassis so that the vehicle has good driving characteristics and has a high resistance to turning over while at the same time possessing a substantial ground clearance for running on rough ground.

Figure 2:
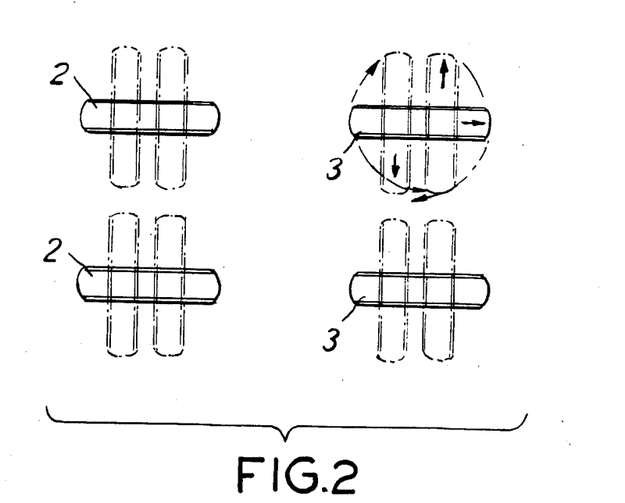
FIG. 2 is a diagrammatic cross section through the driven wheels in the straight ahead position and at the greatest range of swivel angle.
Figure 3A:
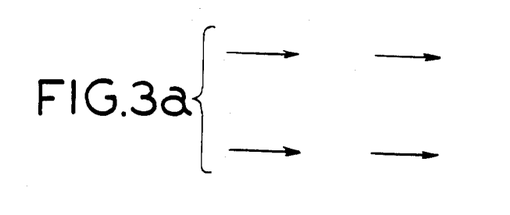
FIGS. 3A–G are diagrammatic plan views of different settings of the wheels for steering.
Figure 3B:
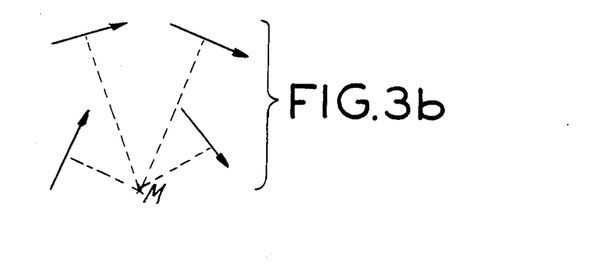
Figure 3C:
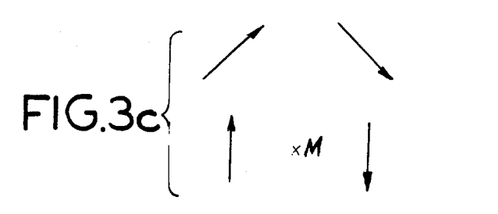
Figure 3D:
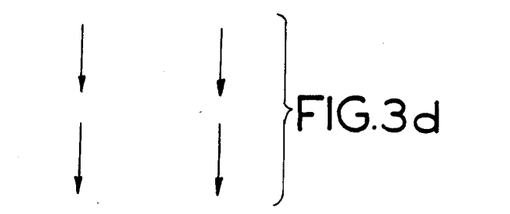
Figure 3E:
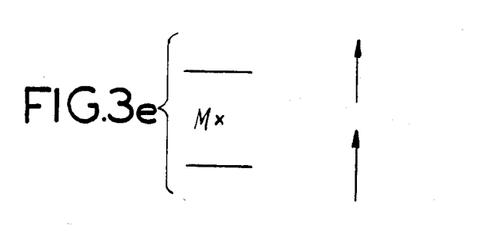
Figure 3F:
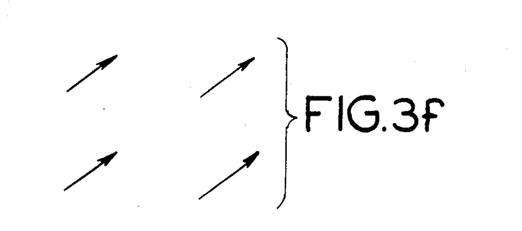
Figure 3G:
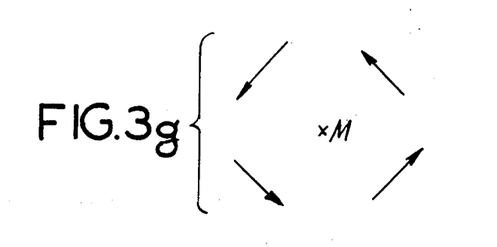

The high degree of maneuverability of the vehicle, outdoing that of a drive steered compact industrial vehicle, is a consequence of the way the wheels are mounted. The industrial vehicle has four steered wheels mounted on a straddling axle structure so that they each swivel through a steering range of 180° symmetrically about the straight ahead position. In other words, the wheels swivel through 90° in either direction from the straight ahead setting, see FIG. 2. In fact the swivel range may be somewhat in excess of 180° and may be 183° for example.

The drive of the separate wheels may be from a central transmission, from transmissions each for two of the wheels only, or from individual transmissions drives for the wheels. The drives are in each case by way of a shaft placed in the straddling structure, a design that is very much cheaper and more space saving than one using hydraulic wheel hub motors for example.

FIG. 3 shows different settings into which the wheels may be swiveled and directions of driving. In FIG. 3a the reader will see the straight ahead setting and in FIG. 3b the wheel setting on turning round a middle point M, which when the wheels are swiveled even further as in FIG. 3c will end up by being a vertical line on a side of the vehicle. In the setting of FIG. 3d all the wheels are swiveled as far as they will go, two of the wheels, that is to say either the front wheels 2 or the back wheels 3, having been swiveled through 180° so that the vehicle crabs. In the wheel setting of FIG. 3e only two of the wheels are being driven, whereas the other two wheels are coasting and the center of the turning circle M is between the two coasting wheels. FIG. 3f shows the possiblity of driving obliquely with the vehicle facing straight ahead, if it is possible for the wheels to be steered in this way. A condition for this type of maneuvering is that the driving means for each pair of wheels mounted on an axle is able to be steered independently from the other(s). Such independent control of the driving means and positions of swivel furthermore makes possible the setting of FIG. 3g in which the vehicle is turning with a sort of roundabout or carousel effect about its middle vertical axis and a zero turning circle radius. The setting of FIGS. 3f and 3g are more specially possible when the wheels are able to be set at any given point or angle within their range of swivel and are then driven in either direction as may be necessary.

Figure 4:
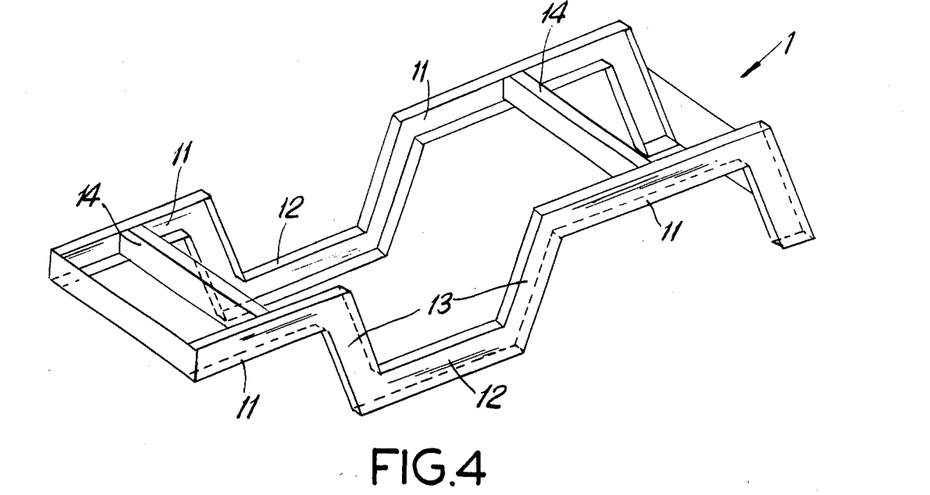
FIG. 4 is a perspective view of the straddling or gantry chassis of the vehicle as in FIG. 1.

FIG. 4 is a perspective view of the chassis 1 that has a straddling or gantry configuration. It has sections 11 placed at a higher level over the wheels and sections 12 at a lower level between the wheels and rising and falling sloping sections 13 joining same together. Between the high level chassis sections 11 there are cross pieces 14. As may be seen from FIGS. 1, 2 and 4 the space under the high level sections 11 is fully available for accommodation and swiveling of the wheels. This proves to be necessary because in their extreme swivel positions there will only be very little clearance between the wheels in the breadth direction or in other words, when looking in the length direction of the vehicle it will only be possible to see a small space between the wheels.

The low level wheel sections 12 have the general effect of lowering the center of gravity and improving the design of the driver seat facility, because the position of the driver is relatively low down and near to the field of operations and he will be able to get on and off the vehicle safely and conveniently over the chassis part 12.

Figure 5:
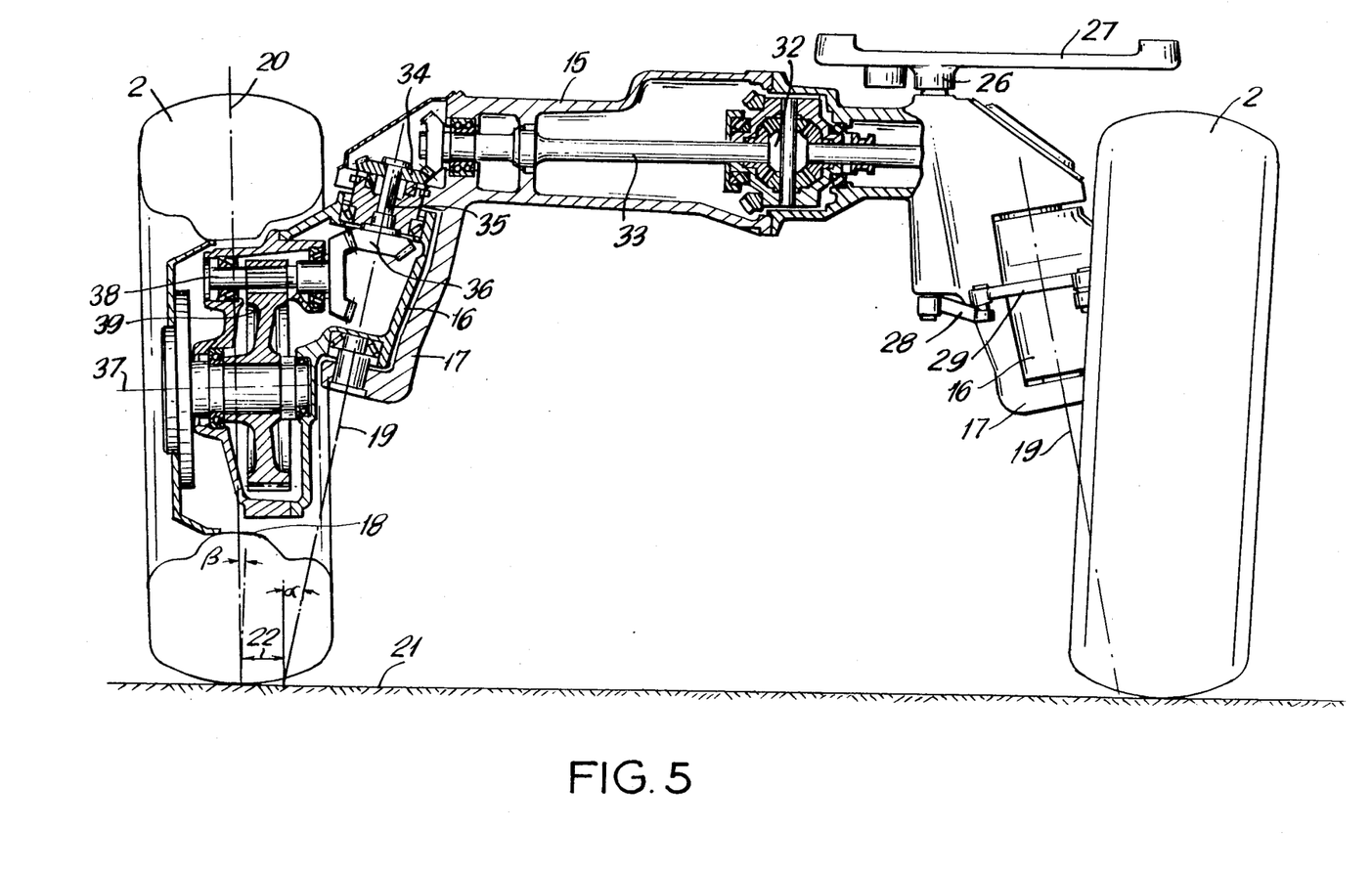
FIG. 5 is a partly sectioned front view of one axle of the compact industrial vehicle.

FIG. 5 is a partly sectioned front view of the front axle for example to make clear the straddling or gantry axle construction. It is composed of an axle member 15 and wheel mounting legs 16 running down therefrom at an angle to the vertical. These legs 16 may be turned in the member for swiveling the wheels and they are pivotally joined up with the axle member or casing by way of support sections 17 that run down from the rest of the axle. Each wheel is bearinged on its leg 16 within the dished part of the wheel member 18. The wheel legs 16 each have a lengthways axis 19 coinciding with the pivot axis thereof and which in the present working example is oblique and within the vertical axial plane of the wheel in question. It makes an angle of 79° to the horizontal so that there is an angle $\alpha$ of inclination of the steering axis or "king pin" inclination of 11°. The radial middle plane 20 of the wheel 2 has a camber angle $\beta$ of 2°. The axis 19 and the middle plane 20 both cut through the tire contact patch on the ground 21 area but separately and in fact for design reasons a steering axis or "king pin" offset 22 is tolerated. The design is however such that this offset is not overly large. If it were large, it would be at the cost of a loss of ground clearance.

The wheels 2 are swiveled by a steering arm member 26, that has two steering arms 27 over the body of the axle 15 and a steering arm 28 thereunder. The steering arms 27 and 28 are torque-transmittingly joined together. One of the lever arms 27 is connected with a power steering system, more specially in the form of a hydraulic cylinder and the other is joined by a track rod (not marked) with the corresponding steering arm of the other wheel of the same axle. The lever arm 28 is joined up by way of a link 29 with the wheel mounting leg 16 with a step-up levering effect for swiveling the leg 16.

On swiveling the steering member 26 through 90° for example the wheel mounting leg 16 will be swiveled through 180° so that the wheel is turned into a completely transverse position and furthermore it will bear an angle to the ground 21 of the order of 77°, answering to an angle to the vertical of 13° which results from the steering axis inclination and the camber as measured in the straight ahead wheel setting. This oblique setting of the wheels does not entail any undesired effects for vehicle statics and for driving characteristics when maneuvering; it is however necessary to leave room for the axle member (see FIG. 6) beside the top of the wheel in the extreme positions of the wheel.

Figure 6:
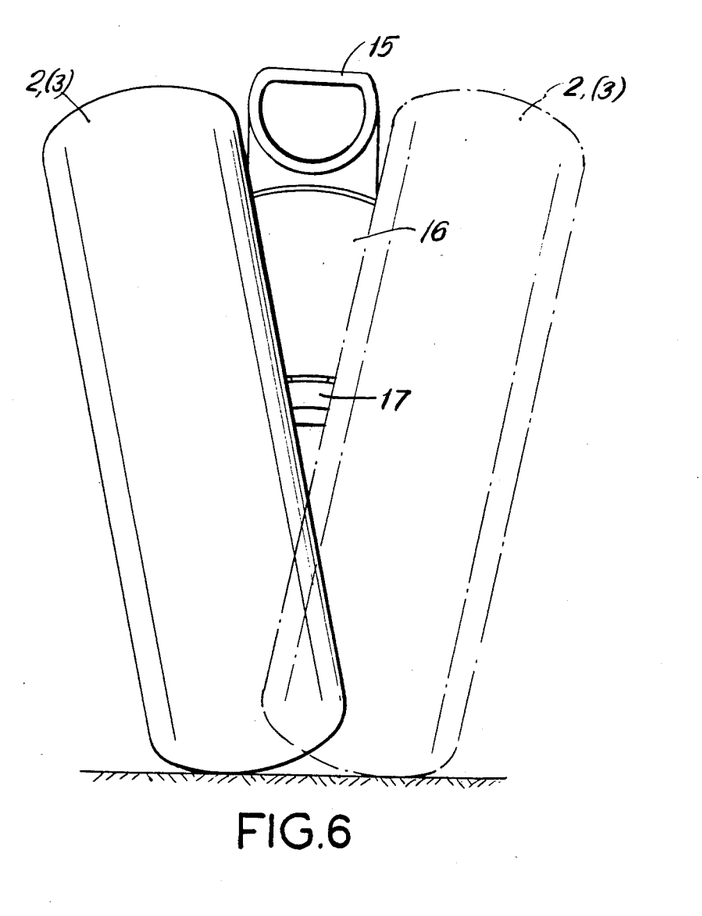
FIG. 6 is a side view of the axle to show the wheel in its two extreme swivel positions.

FIG. 6 makes it very clear how little space is left for the body of the axle and more specially the forked end thereof when a wheel is swiveled out to its full extent. The swivel through 90° in both directions is possible because the wheel mounting leg fits into the concave side of the wheel.

The drive is transmitted by way of a differential 32, a half shaft 33, a first bevel wheel drive 34, an inbetween shaft 35, whose axis is lined up with the lengthways axis of the wheel leg 16, and a second bevel wheel drive 36 to a pinion shaft 38 parallel to the axis 37 of the wheel 2. The drive is then further transmitted by way of spur gearing 39 with a step down effect to the wheel hub. It will be seen from this that, within the body of the axle and the wheel support legs, the drive is transmitted at a relatively high speed with a low torque in comparison with the wheel hub speed.

When the wheels are swiveled into their extreme positions they come quite close together near the lengthways median plane of the vehicle so that the design has to be such that the space under the straddling axle is free on the one hand to get a large ground clearance and on the other hand for swiveling of the wheels. In this respect the vehicle chassis 1 constitutes the lower limit of the vehicle body and the axle members 15 are mounted on the lower sides of the cross pieces 14.

Figure 7:
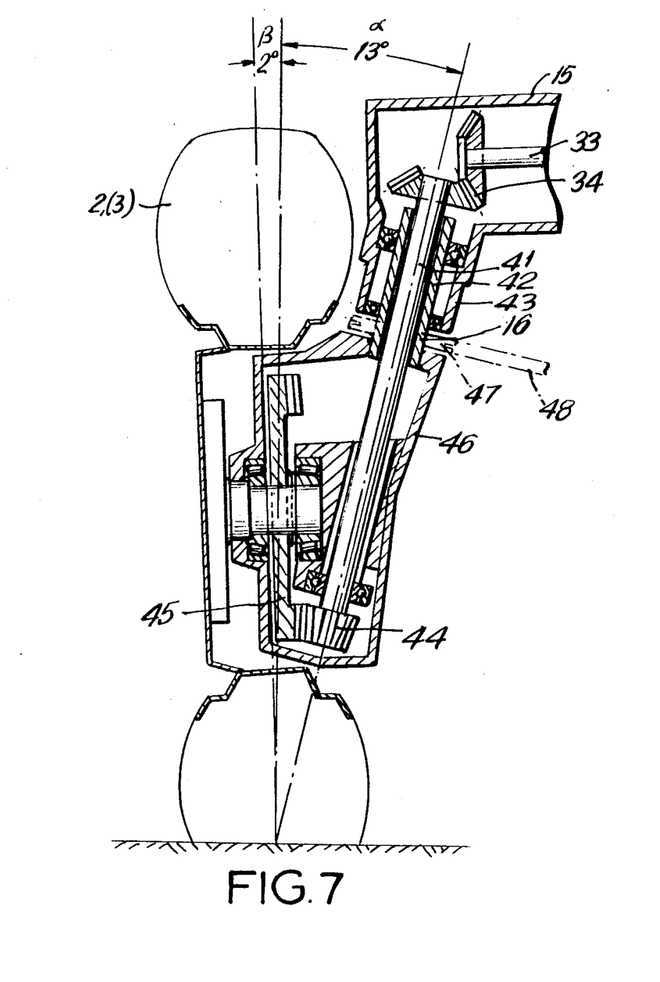
FIG. 7 is a vertical section through a wheel with a wheel mounting leg as part of a different design.
Figure 8:
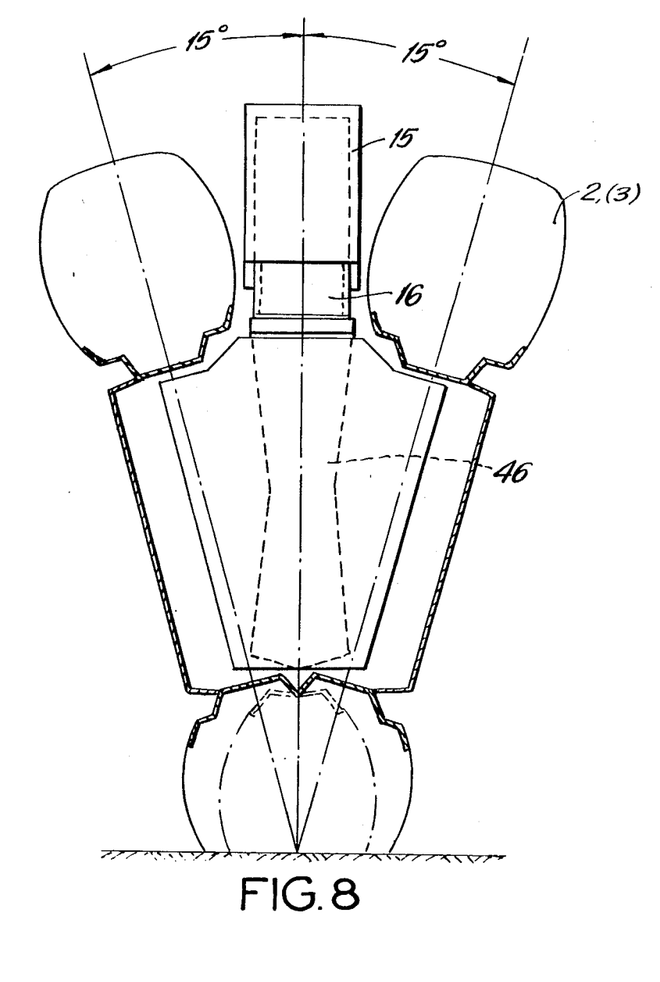
FIG. 8 is a side view of the axle with the wheel mounting leg as in FIG. 7 but with the wheel sectioned in its two extreme swivel positions.

The construction to be seen in FIGS. 7 and 8 also makes possible a high degree of maneuverability and a large ground clearance. The wheel is mounted on a wheel leg 16, that may be named a gantry leg and whose three main parts are coaxial, namely, an inbetween drive shaft 41, a hollow steering shaft 42 coaxial to the inner inbetween shaft 41 and turning separately from it, and a load bearing structure 43 fixedly mounted on the chassis. The load bearing structure 43 is in the present case designed in the form of a sort of housing round the two shafts 41 and 42 and runs upwards in the level axle member 15 stretching athwart the vehicle and in which the half shaft 33 coming from the differential 32 is housed, said shaft driving the inbetween shaft 41 by way of the bevel drive 34.

There are a number of different ways of designing the drive. It may for example be run from a central transmission by way of a universal joint or stiff shaft to the upper bevel gear pair of a wheel drive. It is however furthermore possible for the two upper bevel gears of the front or back wheels to be joined up together by way of shafts placed in the axle members so that the driving system would resemble that of a conventional vehicle with axles. Furthermore it would be possible for the drive system to be a hydrostatic one, in which respect there would be one motor and one pump for the two front wheels and a motor and pump for the back wheels. It would then for example be readily possible to reverse the wheels of one axle when all wheels are swiveled into their extreme positions so that crabbing of the vehicle would be possible.

The coinciding axis of turning of the inbetween shaft 41 and of the steering axis 42, that is to say the lengthways axis of the wheel leg 16, is in the case of this form of the invention out of plumb by 13° as a steering axis inclination angle and is in a plane that is normal to the plane of the wheel and the ground and it contains the axis of rotation of the wheel. The lengthways axes of the wheel legs 16 of the two front wheels 2 are in a first plane and the lengthways axes of the wheel legs 16 of the two back wheels 3 are in a second plane parallel thereto.

The wheel 2 or 3 itself has a camber angle of 2° so that between the lengthways axis of the wheel leg 16 and the wheel plane there is an angle of 15°. Making good use of this angle in the construction the final step down gearing, transmitting the drive to the wheel, is placed within the concave part of the wheel. This final step down gearing is made up of a bevel pinion 44 mounted on the inbetween shaft 41 and a bevel gear 45 meshing therewith which is keyed on the wheel stub axle. Although by having the drive gearing in the lower part of a wheel axle housing 46 there is no trouble with lubrication, the transmission of power and the space requirements are less favorable than in the spur wheel transmission system as used in FIG. 5.

The final step down gearing is on the one hand to be such that the step down effect takes place as far as possible near the wheel, so that the power transmitting components may be kept small and light in weight. On the other hand however the final drive should not, as far as possible, stick out from the wheel outline in order not to rob the vehicle of its ground clearance. The design data including the angle of the leg are for this reason to a large degree dependent on the space within the concave wheel member and, for this reason, on the wheel size and tire breadth.

The wheel axle housing 46 is welded to the hollow steering shaft 42 more or less as an extension thereof and the wheel is bearinged in the housing 46. The housing 46 is swiveled together with the wheel around the lengthways axis of the wheel leg 16 when the steering shaft 42 is turned, something that takes place in the present example by way of a chain drive using a chain sprocket wheel 47 and a chain 48.

FIG. 8 shows, looking in the direction normal to the plane of inclination of the wheel leg 16, the two extreme swivel positions of the wheel 2 or 3, the wheel being sectioned through the concave part thereof (avoiding the center of the wheel) to make the figure clearer the wheel only occupying one of the two positions at a time. The angle between the wheel leg 16 and the wheel plane has such an effect in these two extreme positions that the wheel has an inclination to the vertical that is equal to 15°. This inclination is not great enough to have any undesired effects.

As may be seen from FIG. 8, the axle member 15 and the chain 48 are clear of the wheel in its two extreme positions of the wheel so that it is not necessary for the axle member to be placed at a higher level than the top of the wheel. If a position near the top of the wheel still gives the desired ground clearance, then this position of the axle member 15 is highly expedient as regards enabling the axle to be very strong in design.

The FIGS. 7 and 8 show the lengthways axis 19 of the wheel leg 16 and the wheel diameter in the radial median plane 20 of the wheel running through the tire contact patch and meeting at a point therein so that the steering axis offset is zero. When the wheel is swiveled it is in fact turned on its ground contact patch without any displacement, and this makes the vehicle easy to steer with only a small amount of effect being needed.

Without any change in FIG. 7 or of an end part in FIG. 5 the described design might furthermore be so modified that the plane of inclination of the wheel leg 16 (ie.e. the vertical plane containing the axis of the leg) would not be in the transverse direction of the vehicle but in the length direction thereof. The settings to be seen in FIGS. 6 and 8 would then be the settings for straight ahead travel, whereas the settings of FIGS. 5 and 7, that is to say the middle position of the steering swivel, would be the position for crabbing. This configuration would be likely to be preferred if for example the housing designated as the axle member 15 were to run along the side of the vehicle in the length direction for design reasons. However the design would then be such that for normal driving the wheels would be turned into the oblique position to be seen in FIGS. 6 or 8, which would be perfectly in order for maneuvering but would hardly be very suitable for driving straight.

As may be more specially seen from FIG. 7 the ground clearance is not reduced by the design of the final step down gearing. The wheel leg running upwards at a slope, whose lower end is the wheel axle housing 46, is not likely to jam on obstructions on the ground and there is the full benefit of the gantry.

The steering action, which in FIG. 5 involves operation of the steering members 26, is brought about by linear motors; constructions using one linear motor per wheel, one linear motor per axle or one linear motor for the complete vehicle with transmission of the steering action by way of the steering linkage and a drag link are possible. By making the right choice of the means for controlling the hydraulic linear motors a sophisticated operation of the vehicle is made possible. It is assumed that the piston stops on the two sides in the linear motor correspond to the two 180° apart extreme positions of the wheels. The cylinders of the linear motors are so designed that they are hydraulically balanced. In this respect the displacement volume of the cylinder of the first linear motor is expelled into the cylinder of the second linear motor and so on so that there is synchronous operation of the linear motor. At the end positions of the pistons the cylinders of the linear motors have synchronizing settings, that is to say an overflow by which any irregularities, as produced by possible differential leakage from the separate cylinder seals, are compensated for. Furthermore the linear motors are so conceived that those of the front wheels 2 or those of the back wheels 3 may be switched over from the one extreme position into the other extreme position.

This switching over from one end or extreme position to the other is needed as a precondition to drive the vehicle sideways as the next stage after driving in a circle if there is no facility for reversing two of the wheels. In the case of the program for oblique travel with the wheels parallel there is in any case a common direction of the wheels as an end setting.

A reversible drive for the two front wheels 2 on the one hand and for the two back wheels 3 separately and independently or only for the front wheels 2 or in fact the back wheels 3, is not overly complex in structure and cuts down tire wear and damage to the ground so that it is to be preferred from more than one point of view.

Programmed steering action, in which the wheel planes are always tangential to the cornering radius to reduce tire chafing, is possible (although not shown in a figure), by having the steering wheel joined with a transmission that drives two hydraulic cylinders with pistons, that is to say linear pumps by way, for example, of step down gearing and one or more cams or with the help of a variable velocity ratio drive, as for example one with elliptical gear wheels, or one having suitably dimensioned lever linkages. The linear pumps would then in the one case drive the wheels on the left hand side and the other would drive the linear motor or motors of the wheels of the right hand side. The linear motors of the wheels of the left side and those of the wheels of the right side would in each case be balanced, that is to say joined up in series, synchronization being possible in the end or in the middle position. The cam outline would be such that the volumes supplied to the linear motors of the two sides would be different in such a way that there would be the desired agreement or alinement of the amounts of wheel swivel on the two sides.

In keeping with a preferred form of the industrial vehicle, the axle member to the front on the one hand and to the back on the other join the wheel legs and one of the axle members, on which the two wheel legs are rigidly fixed, is in the form of a jointed cross shaft axle so that there is better engagement with the ground. As explained, the axle member with the wheel leg, that contains the gantry or straddling drive in the form of a bevel drive, is placed at a lower level than the top of the wheel, something that is made possible by the sloping wheel leg and the limitation of the wheel swivel to 180° with the free space resulting therefrom (FIGS. 6 and 8).

In order to save space, the drive engine 51 is placed to the side, i.e. to the left or the right of the driver, so that the lengthways axis of the engine, that is to say the axis of the crank shaft, is placed at roughly 90° to the lengthways axis of the vehicle and the engine is placed in the middle third of the wheel base, that is to say of the space between the front wheels and the back ones so that the crank shaft axis may be placed at a lower level than the tops of the wheels without this limiting swiveling of the wheels. The sheet metal floor of the vehicle on which the driver puts his feet is at a higher level than an extension of the crank shaft axis so that the engine and the center of gravity of the vehicle are relatively low and there is an economic use of the space available, while at the same time the ground clearance, equalling for example 400 mm, is still quite large.

I claim:

1. A compact industrial vehicle comprising a frame (1) extending in the normal forward travel direction, wheel support legs (16) each having a lengthways axis mounted on said frame, four steerable and powerable wheels (2, 3) suspended from said frame (1) by said wheel support legs (16), each said wheel having a wheel rim with said wheel support extending upwardly from said wheel rim to said frame, relative to the forward travel direction of said wheels (2, 3) said wheels are displaceable from the forward travel direction into a lateral direction, wherein the improvement comprises:
   (a) frame (1) is formed as a multi-level construction including frame segments (11) located above said wheels and second frame segments located vertically below said first frame segments and arranged between the wheels in the normal forward direction and third frame segments (13) extending upwardly and obliquely of the vertical between said first and second frame segments;
   (b) said wheel support legs include horizontal axles (15) located at the upper part of said wheels with said wheel supports extending downwardly from said axles (15) to said wheels (2, 3);
   (c) in the vertical direction said axles (15) are positioned between the lower side of said first frame segments (11) and the center of said wheels (2, 3);
   (d) a motor (51) for driving said wheels is located on the upper side of said second frame segments; and
   (e) said frame having a front end and a rear end spaced apart in the normal travel direction and a pair of sides extending in the normal travel direction between the front and rear ends, an operator station located on said frame in the region of and above said second frame segments with an entrance to said operator's station on one said side of said frame, and a boom for mounting a working attachment articulated to said frame behind said operator station in the normal travel direction and pivoted to said frame on the opposite side thereof from the entrance to the operator station.

2. Compact vehicle, as set forth in claim 1, wherein said wheels are pivotal from the normal travel direction by 90° on each side of the normal travel direction position so that said wheels can be pivoted through approximately 180°.

3. The compact vehicle as claimed in claim 2 characterized in that in the positions in which the wheels (2 and 3) are turned sideways through 90°, parts of the wheels are, in respect of the opposite position on the axle body (15), overlapped.

4. Compact vehicle, as set forth in claim 1, wherein the distance between the center of said wheels in the forward travel direction is at least 1.5 times the wheel diameter and said vehicle having an overall length without attachment of approximately three times the wheel diameter.

5. The compact vehicle as claimed in claim 1 characterized in that the extension of the lengthways axis (19) of the wheel leg (16) runs through the contact patch on the ground of the wheel (2, 3) joined to the leg.

6. The compact vehicle as claimed in claim 1 characterized in that the angle of inclination of the lengthways axis of the wheel leg (16) to the vertical is between 10° and 16° and the wheels (2 and 3) have a camber angle of the order to 2°.

7. The compact vehicle as claimed in claim 1 characterized in that the wheel mounting legs (16) have steering shafts (42) running to the wheel bearings thereof and each of the steering shafts has a coaxial sprocket wheel (47) acted upon by a chain (48) for steering.

8. The compact vehicle as claimed in claim 7 characterized by a steering arm (26) acting on each steering shaft (42).

9. The compact vehicle as claimed in claim 8 characterized in that the steering arm (26) has a drive (28 and 29) connecting it with the steering shaft for acting thereon.

10. The compact vehicle as claimed in claim 8 characterized in that the steering lever (26) is placed partly over and partly under the axle member (15).

11. The compact vehicle as claimed in claim 10 characterized in that with the exception of any steering lever parts (28) the space under the axle member (15) is free.

12. The compact vehicle in claim 1 characterized in that a driver cabin (4) placed round the driver's station and has a windshield (7) with a low bottom edge such that there is a view from eye level of the driver through the windshield to an applicance (5) coupled with said boom on the vehicle and placed in front of the front wheels of the vehicle.

13. The compact vehicle as claimed in claim 12 characterized in that for operation of the steering system there is a handlebar (8) placed in the driver's cabin (4).

* * * * *